United States Patent [19]

Wozniak et al.

[11] Patent Number: 4,505,816
[45] Date of Patent: Mar. 19, 1985

[54] FILTER SUPPORT ASSEMBLY

[75] Inventors: Leonard J. Wozniak; William C. Brasie, both of Midland, Mich.

[73] Assignee: The Dow Chemical Company, Midland, Mich.

[21] Appl. No.: 575,246

[22] Filed: Jan. 30, 1984

[51] Int. Cl.$^3$ ............................................. B01D 29/16
[52] U.S. Cl. ................................... 210/439; 210/446; 210/453; 210/484; 210/497.01
[58] Field of Search ............... 210/232, 356, 438, 439, 210/446, 453, 484, 485, 486, 491.01, 491.1

[56] References Cited

U.S. PATENT DOCUMENTS

| 970,982 | 9/1910 | Bond | 210/446 |
| 1,810,965 | 6/1931 | Hopkins | 210/484 |
| 3,295,687 | 1/1967 | Schmerler | 210/486 |
| 3,805,961 | 4/1974 | Clark et al. | 210/356 |
| 4,024,065 | 5/1977 | Morgan, Jr. | 210/453 |
| 4,064,049 | 12/1977 | Calvano | 210/438 |

Primary Examiner—John Adee
Attorney, Agent, or Firm—R. B. Ingraham

[57] ABSTRACT

A filter holder is provided adapted to receive a filter sock and provides at least 65 percent usable area of the filter sock.

7 Claims, 6 Drawing Figures

FILTER SUPPORT ASSEMBLY

In many instances it is desirable to filter a liquid to remove suspended solids therefrom. One particularly useful variety of filter employs a generally cylindrical housing which encloses a generally hollow cylindrical foraminous body. A filter medium such as a fabric is disposed within the hollow cylindrical body, a liquid passed into space surrounded by the filter medium and is forced through the filter medium and through the foraminous body and is discharged from the filter housing. A wide variety of filter media are available for filters of this general type. Oftentimes it is desired to utilize such filters with corrosive materials. Generally such filter housings for corrosive materials utilize corrosion resistant metals such as nickel, stainless steel and the like. Oftentimes such filter housings are expensive to fabricate and require extensive custom fabrication. Generally when employed with a fabric filter medium or sock, such filters often provide no more than about 60 percent of the area of the filter medium in unsupported form which permits free passage of liquid therethrough.

It would be desirable if there were available an improved filter support housing.

It would also be desirable if there were available an improved corrosion resistant filter support housing.

It would also be desirable if there were available an improved corrosion resistant filter support housing which would permit more efficient use of the filter medium.

These benefits and other advantages in accordance with the present invention are achieved in a filter support member comprising a hollow cylindrical housing having a first end and a second end, the generally hollow cylindrical housing having a first end cap affixed to the first end, the end cap defining a generally centrally disposed opening of a diameter less than the diameter of the hollow cylindrical housing, a second generally like end cap disposed on the second end thereof, a filter support core disposed within space enclosed by first and second end caps and the housing, the core comprising a generally hollow cylindrical body having a first end and a second end, the body first end being disposed adjacent the first end cap and the second end being disposed adjacent the second end cap; the first end of the filter support body being in contact with a first end plate, the first end plate defining a generally centrally disposed passageway therethrough, providing communication between a space internal to the body and a generally cylindrically disposed passage in the first end cap, the first body end plate being in liquid-tight sealing engagement with the first end cap; a second end plate adjacent the second end of the filter support; the second end plate adjacent the second end cap defining a plurality of radially extending grooves providing communication between space external to the filter support body and the passageway of the second end cap; the body defining a plurality of generally radially extending passages, the passages providing communication between a space internal to the body and space external thereto, the external surface of the body defining a plurality of axially extending lands and grooves; the internal surface of the body defining a plurality of generally radially inwardly extending bodies, the bodies covering not more than 35 percent of the area of a projected internal surface of the body, and desirably 30 percent.

Further features and advantages of the present invention will become more apparent from the following specification taken in connection with the drawing wherein.

Figure 1:
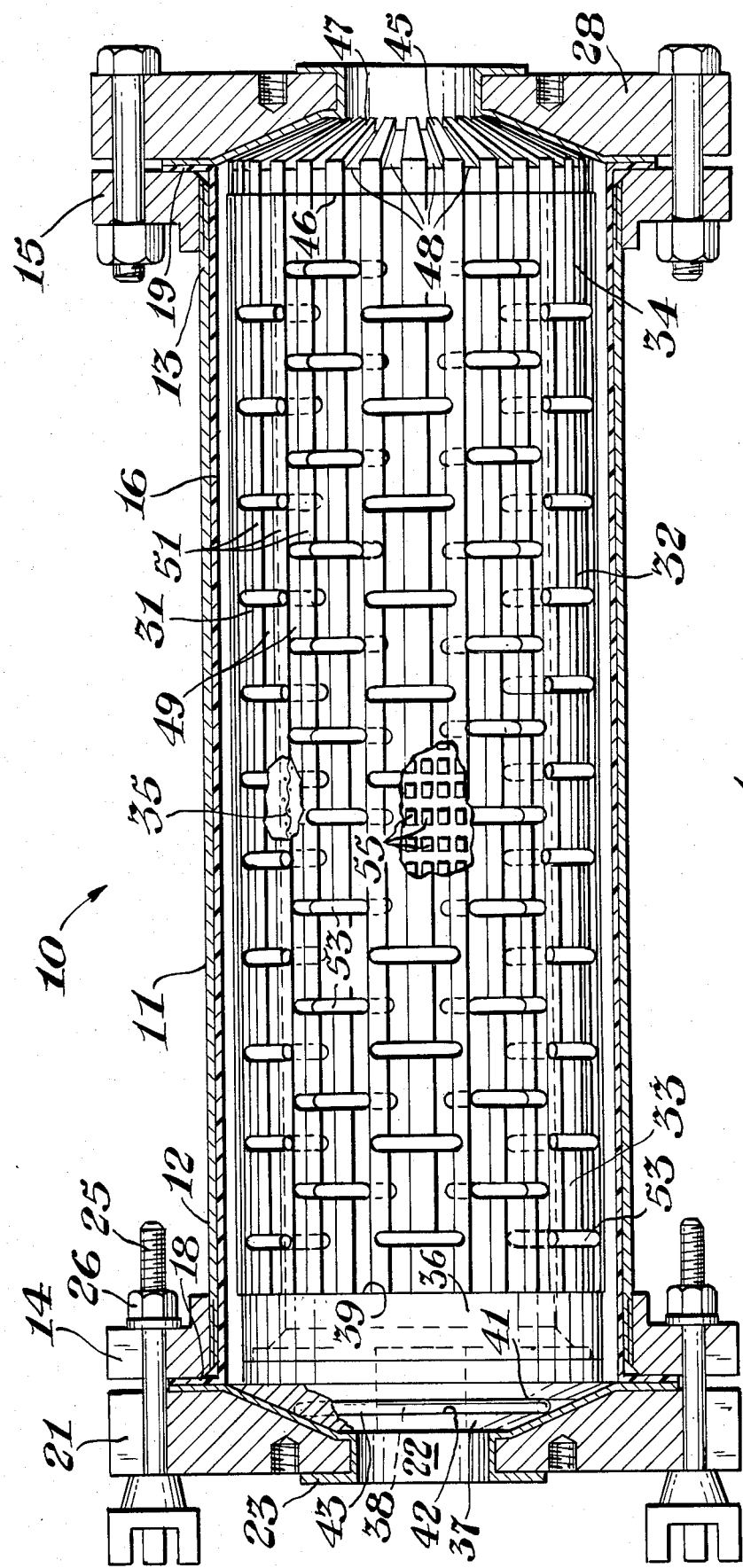
FIG. 1 is a schematic sectional representation of a filter support in accordance with the present invention.

In FIG. 1 there is schematically depicted a sectional view of a filter housing in accordance with the present invention generally designated by the reference numeral 10. The filter housing 10 comprises in cooperative combination a generally cylindrical conduit 11 having a first end 12 and a second end 13. Disposed on the ends 12 and 13 are pipe flanges 14 and 15 respectively. The conduit 11 as depicted in FIG. 1 is a metal conduit having disposed therein a synthetic resinous lining 16. The lining 16 terminates adjacent the flanges 14 and 15 in liner flanges 18 and 19 respectively. A first end cap or reducing flange 21 is disposed at the first end 12 of the conduit 11. The end cap or flange 21 defines a generally centrally disposed aperture 22 and has synthetic resinous lining 23. The end cap 21 is affixed to flange 14 of the conduit 11 by means of a plurality of bolts 25 having associated therewith nuts 26. Affixed to the flange 15 of the second end 13 of the conduit 11 is a flange 28 of generally like configuration to the flange 21.

Disposed within space enclosed by the conduit 11 and flanges 21 and 28 is a filter medium support assembly generally designated by the reference numeral 31. The filter support assembly 31 comprises a generally hollow cylindrical foraminous body 32 having an outside diameter which approximates the inside diameter of the conduit 11 and extends generally from the first end 12 to the second end 13. The body 32 has a first end 33 and a second end 34. The first end 33 of the body 32 is disposed generally adjacent the first end 12 of the conduit 11. A filter sock 35 is disposed within the body. Adjacent the first end 33 of the body 32 is disposed a closure ring 36. The closure ring 36 has a diameter approximating that of the body 32 and is adapted to receive the mouth of a foraminous filter medium such as a filter sleeve or sock. Disposed adjacent the annular closure ring 36 is a first end plate 37. The end plate 37 is of generally annular configuration and defines therein a passage 38 which is generally axially extending. The end plate 37 has a generally planar surface 39 disposed adjacent body 32 and a generally frustoconical surface 41 disposed adjacent the flange 21. The end plate 37 has defined in the frustoconical surface a generally annular groove 42 having disposed therein an O ring 43. The O ring 43 is in sealing engagement with the adjacent surface of the flange 21.

A second end plate 45 is disposed at the second end 34 of the body 31. The end plate 45 is of generally discoidal configuration and has a generally planar face 46 in contact with the second end 34 of the body 31 and a generally frustoconical face 47 disposed adjacent the flange 28. The plate 45 on the frustoconical face defines a plurality of generally radially extending grooves designated by the reference numeral 48. The body 31 on the external surface thereof defines a plurality of generally axially extending grooves 49 disposed between axially extending lands 51. The body 32 defines a plurality of radially disposed passages or slots 53 generally uniformly spaced in the body 32 to provide communication between space external to the body 32. A plurality of bosses designated by the reference numeral 55 are disposed on the inner surface of the filter support body 32. The bosses 55 account for less than about 65 percent of the generally cylindrical surface to which they are attached.

Figure 2:
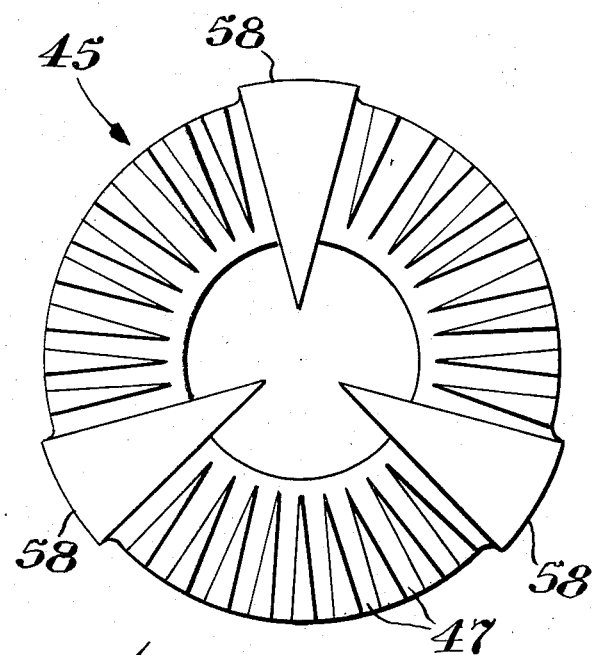
FIG. 2 is an end view of a discharge end plate in accordance with the present invention.

In FIG. 2 there is depicted a view of the end plate 45. The plate 45 is viewed from its end having a frustoconical facing and a plurality of radially extending grooves 47. The plate 45 defines 3 circumferentially disposed locating bosses designated by the reference numeral 58. A circle containing the periphery of the bosses 58 approximates the internal diameter of the conduit 11.

Figure 3:
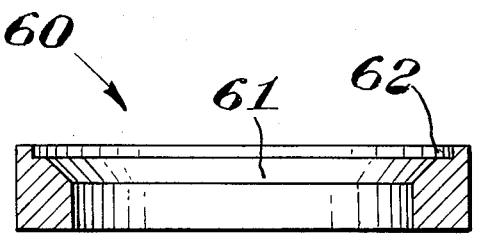
FIGS. 3 and 4 depict sectional views of two different closure rings suitable for use with the filter support of the FIG. 1.

In FIG. 3 there is depicted a sectional view of a closure ring generally designated by the reference numeral 60. The closure ring 60 has internal generally frustoconical face 61 which terminates at major diameter in a generally rectangular recess 62 adapted to receive the mouth of a filter bag or sock.

Figure 4:
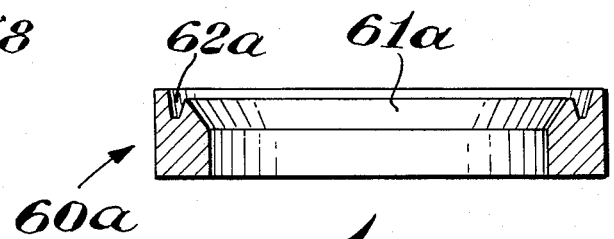

In FIG. 4 there is depicted a sectional view of a closure ring 60a. The ring 60a has a generally frustoconical surface 61a terminating at a generally axially extending V groove 62a. Use of closure rings as depicted in FIGS. 3 and 4 permits the use of most commercially available filter socks.

Figure 5:
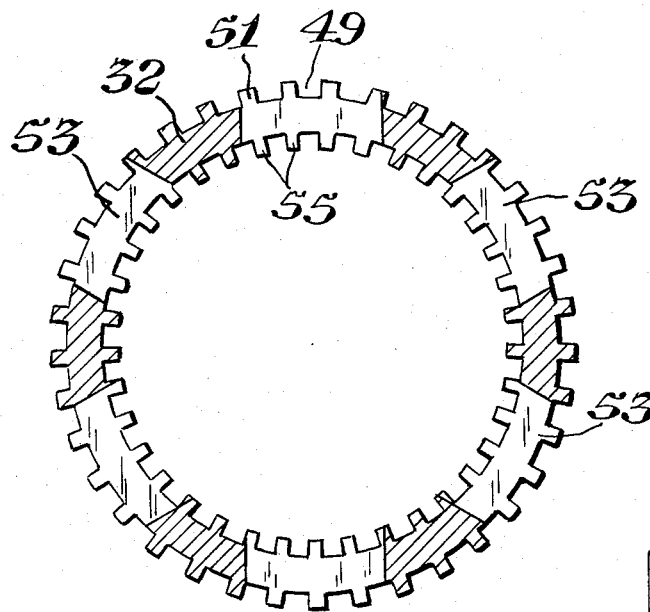
FIG. 5 is a sectional view through the filter support body of FIG. 1.
Figure 6:
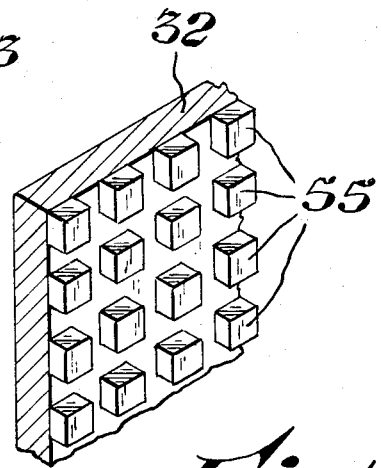
FIG. 6 is a view of a flat development of the inner surface of the filter support body of FIG. 1.

In FIG. 5 there is depicted a sectional view of the body 32 showing the location of bosses 55 on the internal surface thereof. As depicted in FIGS. 5 and 6, passageways 53 are shown.

FIG. 6 is a planar development of the inner surface of the body 32 showing the arrangement of the bosses 55. As depicted in FIG. 6, the bosses 55 have a generally cubic configuration and are arranged in a square pattern.

In operation of the filter support in accordance with the present invention, the end cap 21 and end plate 37 are removed and a filter sock placed within the body 32 and within the closure ring 36. Plate 37 is relocated into its original position to secure the mouth of the filter sock, and the end cap 21 clamped in sealing engagement with plate 37. A supply liquid conduit is connected to the cap or flange 21 and liquid forced into space within the body 32 and within a filter sock applied thereto. The filter sock is supported by the bosses 55. The liquid passes into space between the bosses, through the generally radially extending slots 53, into the axially extending grooves 49 between the lands 51. The filtered liquid then flows axially in the grooves 49 to second end 34 of the body 32. The liquid flows between the bosses 58 of plate 45 into the grooves 47 of the plate 45, and exits through the flange or end cap 28.

Advantageously filter supports in accordance with the present invention are readily prepared employing commercially available plastic lined pipe components. The conduit 11 and associate flanges may be commercially available as so-called "spool piece". The flanges 21 and 28 can be commercially available as plastic lined reducing flanges.

Advantageously for corrosive chemical service, fluorocarbon polymers such as tetrafluoroethylene linings are preferred for maximum chemical and temperature resistance. However, other plastic linings are useful.

Advantageously, the end plates 37 and 45 are fabricated by turning and boring from a plastic plate of suitable thickness such as tetrafluoroethylene polymer. The plate 45 is subsequently milled to form the bosses and the radially extending grooves. The body 32 advantageously is formed from a synthetic resinous tube or pipe as are clamp rings, such as are depicted in FIGS. 3 and 4. The generally radial slots in the body 32 are formed by milling using a plunge cut. The external grooves such as the grooves 49 are formed also by milling. The internal bosses are formed by cutting a plurality of axially extending grooves on the inner surface of the synthetic resinous conduit and subsequently forming a plurality of circumferential grooves and by forming rectangular bosses.

By way of further illustration, employing an 8-inch diameter synthetic resinous tube having walls 1 inch in thickness, a desirable configuration employs external grooves of 5/16 inch and a depth of about ¼ inch, while the lands between the grooves have a width of about 3/16 inch; and on the inside surface bosses are formed which are about ⅜ inch square, ¼ inch high and spaced from adjacent bosses by about 3/16 inch. Filters in accordance with the present invention provide excellent service at moderate cost.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended claims.

What is claimed is:

1. A filter support member comprising a hollow cylindrical housing having a first end and a second end. the generally hollow cylindrical housing having a first end cap affixed to the first end, the end cap defining a generally centrally disposed opening of a diameter less than the diameter of the hollow cylindrical housing, a second generally like end cap disposed on the second end thereof, a filter support core disposed within space enclosed by first and second end caps and the housing, the core comprising a generally hollow cylindrical body having a first end and a second end, the body first end being disposed adjacent the first end cap and the second end being disposed adjacent the second end cap; the first end of the filter support body being in contact with a first end plate, the first end plate defining a generally centrally disposed passageway therethrough, providing communication between a space internal to the body and a generally cylindrically disposed passage in the first end cap, the first body end plate being in liquid-tight sealing engagement with the first end cap; a second end plate adjacent the second end of the filter support; the second end plate adjacent the second end cap defining a plurality of radially extending grooves providing communication between space external to the filter support body and the passageway of the second end cap; the body defining a plurality of generally radially extending passages, the passages providing communication between a space internal to the body and space external thereto, the external surface of the body defining a plurality of axially extending lands and grooves; the internal surface of the body defining a plurality of generally radially inwardly extending bodies, the bodies covering not more than 35 percent of the area of a projected internal surface of the body; and desirably 30 percent.

2. The filter support of claim 1 wherein the inwardly extending bodies cover not more than 30 percent of the internal surface of the body.

3. The filter support of claim 1 including an O ring disposed between the first body end plate and the first end cap.

4. The filter support of claim 1 including a filter sock disposed within the filter support body.

5. The filter support of claim 1 wherein the filter support body is a fluorocarbon.

6. The filter support of claim 5 wherein the filter support body is a tetrafluoroethylene polymer.

7. The filter support of claim 1 wherein the filter support body internal surface defines a plurality of generally circumferentially extending grooves.

* * * * *